March 22, 1966 G. H. DYRDAHL 3,241,301
CUTTING AND WINDROWING DEVICE
Filed April 6, 1964 3 Sheets-Sheet 1

INVENTOR.
GORDEN H. DYRDAHL
BY
Merchant, Merchant + Gould
ATTORNEYS

March 22, 1966  G. H. DYRDAHL  3,241,301
CUTTING AND WINDROWING DEVICE
Filed April 6, 1964  3 Sheets-Sheet 2
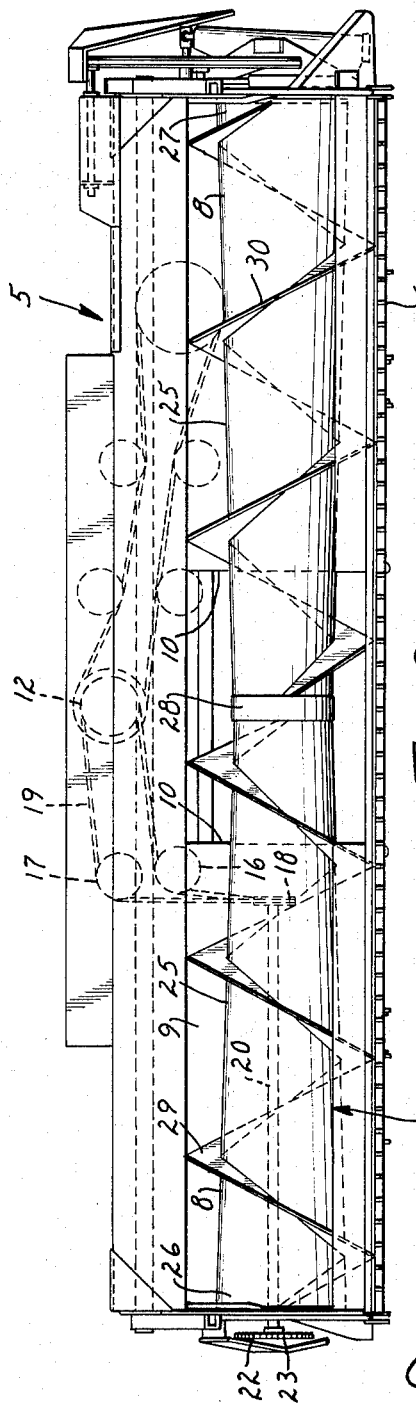
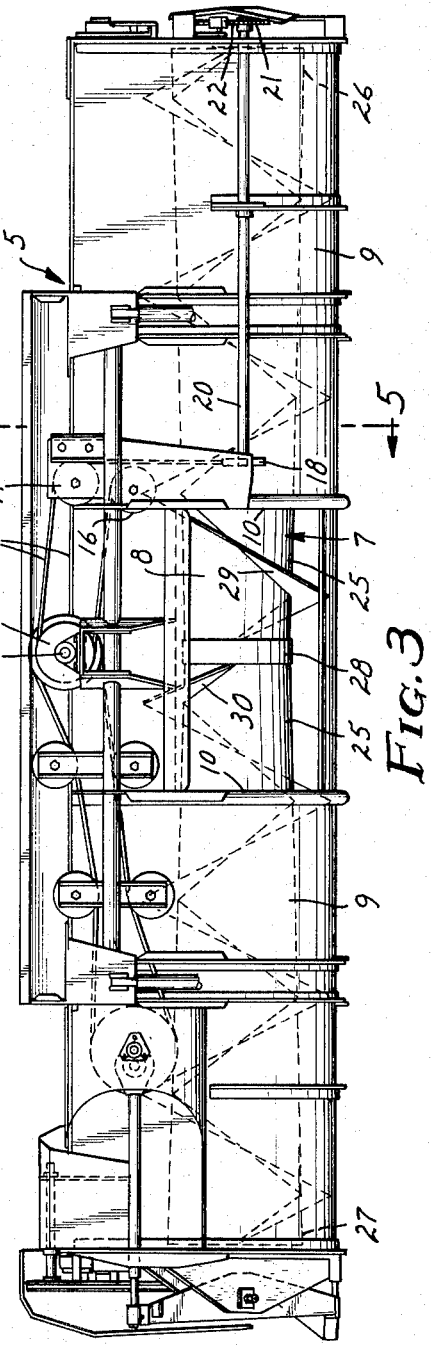
INVENTOR.
GORDEN H. DYRDAHL
BY
Merchant, Merchant & Gould
ATTORNEYS INVENTOR.
GORDEN H. DYRDAHL
BY
Merchant, Merchant + Gould
ATTORNEYS

United States Patent Office 3,241,301
Patented Mar. 22, 1966

3,241,301
CUTTING AND WINDROWING DEVICE
Gorden H. Dyrdahl, Owatonna, Minn., assignor to Owatonna Manufacturing Company, Inc., Owatonna, Minn., a corporation of Minnesota
Filed Apr. 6, 1964, Ser. No. 357,621
2 Claims. (Cl. 56—23)

My invention relates generally to crop harvesting machines, and more specifically, to power-operated swathers.

More specifically, my invention relates to improvements in self-propelled swathers of the type disclosed in application Serial No. 81,065, filed January 6, 1961, "Self-Propelled Swather," now Patent No. 3,151,429 issued October 6, 1964.

The conventional power-operated swather comprises a windrower mounted for raising and lowering movements on the forward end of a mobile frame, and includes a horizontally disposed sickle-bar type mower, elongated transversely of the path of travel of the frame, and a conveyor disposed generally rearwardly of the mower and generally parallel thereto for receiving cut material from the mower and delivering same in a direction longitudinally of the mower and disposing said material on the ground in a windrow. These conveyors usually are in the nature of opposed belts which feed in opposite directions and dispose the harvested material delivered thereto from the mower to a central point where they are deposited on the ground to form a windrow as the mobile frame progresses along its path of travel. Such conveyors not only require relatively costly driving and supporting mechanism, but also are costly to maintain because of frequent replacement and repair of the flexible belts, occasioned by frictional wear.

The object of my invention is the provision of an improved conveyor mechanism which requires a minimum of supporting structure and driving mechanism, and is consequently cheaper and more foolproof to manufacture and service, and which also substantially eliminates the expense of replacement and maintenance.

The above and still further objects of my invention will become apparent from the following detailed specification, appended claims, and attached drawings.

Referring to the drawings wherein like characters indicate like parts throughout the several views:

FIG. 2 is an enlarged view in front elevation of the structure of FIG. 1, portions thereof not being shown;

FIG. 3 is an enlarged view partially in rear elevation and partially in section as seen from the line 3—3 of FIG. 1;

Figure 1:
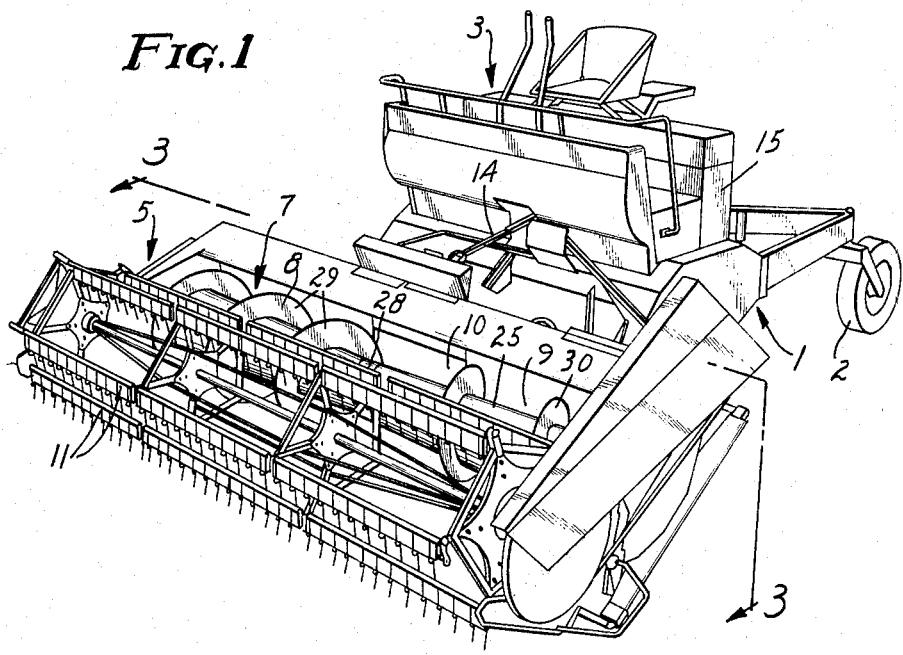
FIG. 1 is a view in perspective of a swather constructed in accordance with my invention.
Figure 4:
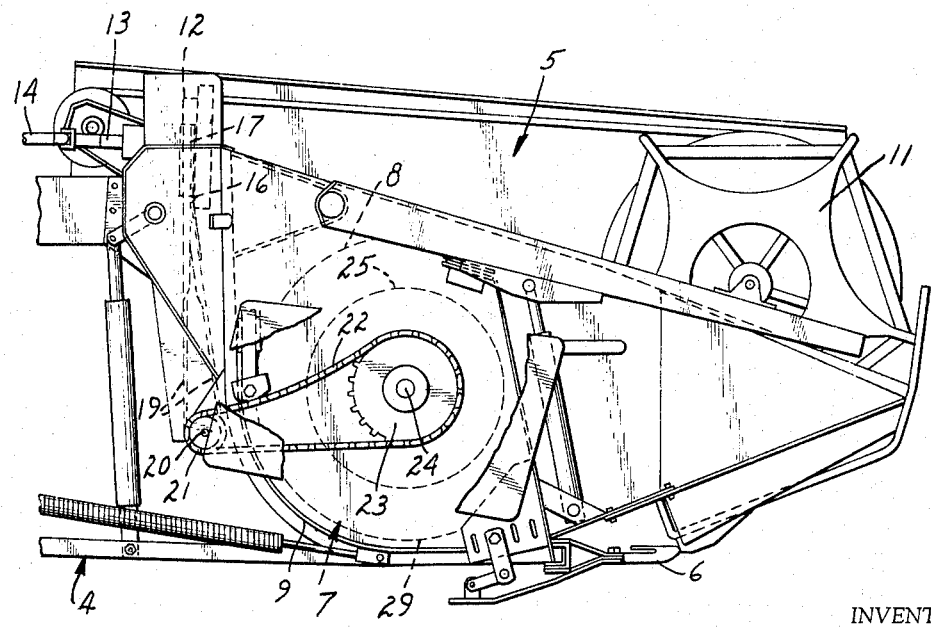
FIG. 4 is an enlarged view in elevation as seen from left to right of FIG. 1, portions thereof being broken away.

Referring with greater particularity to the drawings, the numeral 1 indicates in its entirety a generally rectangular mobile frame structure which, in conventional manner, is mounted on wheels 2, only one of which is shown, and is provided with manually operated driving mechanism, identified generally as at 3.

Pivotally secured to the forward end portion of the frame 1 for raising and lowering movements by means of linkage indicated generally at 4, and more specifically shown in my above-identified application, is a windrow, identified in its entirety by 5. Windrow 5 comprises a horizontally disposed conventional sickle-bar type mower 6, which, as shown, is elongated in a direction transversely to the direction of travel of said frame 1, and a horizontally disposed conveyor 7, which is located generally rearwardly of the mower 6 and is generally parallel thereto so as to receive cut material from said mower as the frame 1 progresses along its path of travel. Conveyor 7 in turn includes an auger 8 and an upwardly and forwardly opening trough 9, the central portion of which defines a discharge opening 10 for material delivered to the auger 8 from the mower 6. In conventional manner a reel 11 is positioned in generally overlying relationship to the mower 6 to initially position uncut crop for severance by the mower 6 and subsequently to elevate and deliver same to the conveyor 7.

Figure 5:
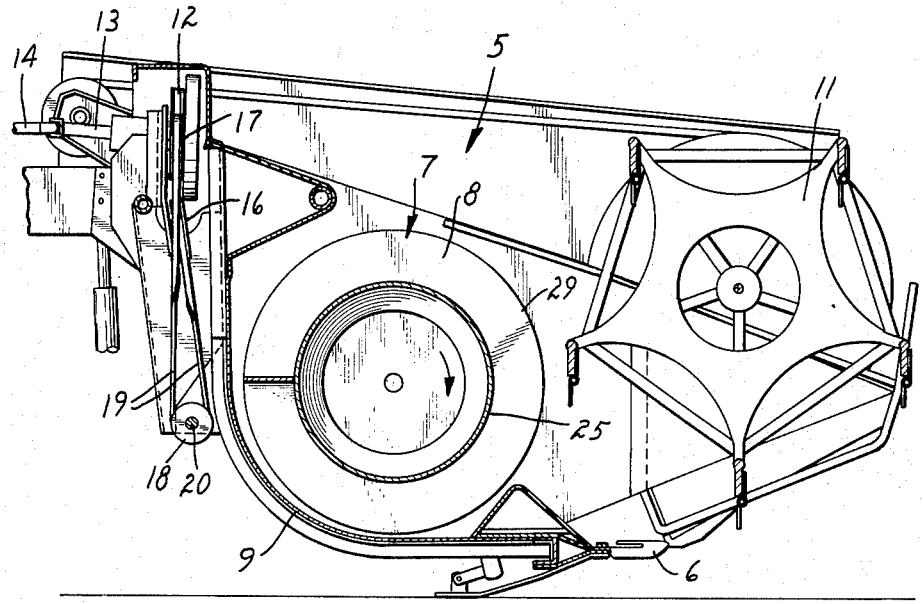
FIG. 5 is a view in vertical section taken on the line 5—5 of FIG. 3.
Figure 6:
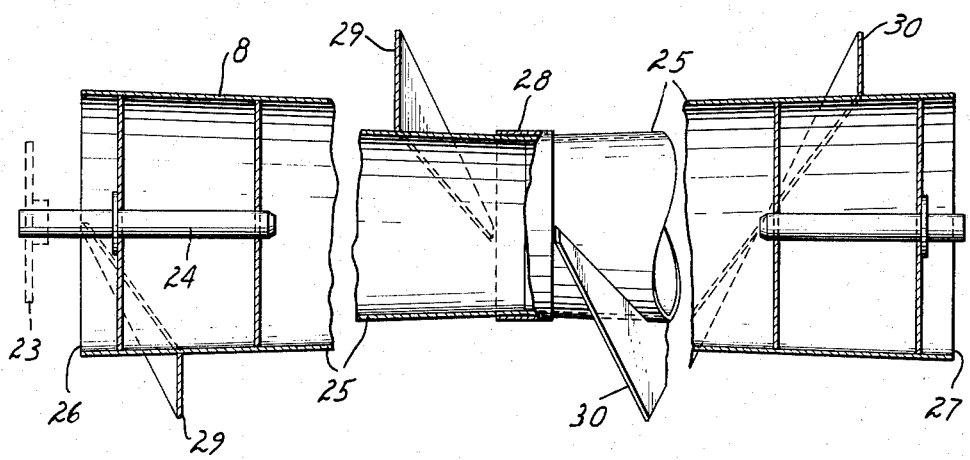
FIG. 6 is an enlarged view in elevation of the auger conveyor, some parts thereof being broken away and some parts shown in section.

To impart rotary feeding movements to the auger 8 in the direction of the arrow of FIG. 5, I provide a mechanism comprising a sheave 12 which is mounted for rotation on a horizontally disposed shaft 13, which in turn is connected to the power take-off shaft 14 of the power source, not shown, but contained within a housing 15 on the frame 1. Entrained over sheave 12 and over a pair of idler sheaves 16, 17 rotatively mounted on the windrower 5 and a sheave 18, is a flexible driving belt 19. Secured fast to the sheave 18 is a horizontally disposed driving shaft 20, suitably journalled to the windrower 5. Mounted fast on the outer end of drive shaft 20 is a drive sprocket 21 over which is entrained a flexible link chain 22. Chain 22 is likewise entrained over a second sprocket 23 fast on a trunnion 24 journalling one end of the auger 8.

The driving mechanism for the sickle-bar mower 6 forms no part of the present invention, and consequently will not be discussed in detail, other than to state it is adequately shown in my above-identified application.

As shown, the auger 8 includes a central core 25, which for purposes of lightness but strength, is preferably tubular and which, as shown, tapers from its opposite ends 26, 27 to a diametrically reduced central delivery portion 28 adjacent said discharge opening 10. Auger 8 also includes opposed helical conveyor flights 29, 30 which extend from their respective opposite ends 26, 27 to a point adjacent said reduced central delivery portion 28 of the core 25, and each thereof adapted to deliver harvested material, fed thereto by the reel 11, to said discharge opening 10. As shown, each of the conveyor flights 29, 30 is identical and each has a uniform maximum diameter throughout its length whereby to provide a uniform spacing therebetween and the underlying trough 9. On the other hand, the minimum diameters of each of the helical flights 29, 30 decreases progressively from its opposite ends 26, 27, respectively, of the core 25 to said central delivery portion 28 thereof in direct proportion to the decrease in diameter of said core 25. This arrangement imparts a progressively increased capacity to the flights 29, 30 as they approach central opening 10, thereby compensating for the increased amount of harvested material received and moved thereby, so as to keep such material moving toward the discharge opening 10 in lieu of impacting same to such a degree as it may have a tendency to become wrapped about the core 25. If it were not for this unique arrangement, it would not be feasible to utilize an auger conveyor because of the constant capacity of such conveyors along their entire length.

My invention has been thoroughly tested and found to be completely satisfactory for the accomplishment of the above objects; and while I have disclosed a preferred embodiment thereof, same may well be capable of modification without departure from the scope and spirit of the appended claims.

What is claimed is:
1. A swather comprising:
(a) a mobile frame,
(b) a windrower including a horizontally disposed mower elongated in a direction transversely of the direction of travel of said mobile frame,
(c) a conveyor disposed generally rearwardly of said mower and generally parallel thereto for receiving cut material from said mower and delivering said material in a direction longitudinally of said mower and depositing said material on the ground in a windrow,
(d) means mounting said windrower on said frame,
(e) said conveyor comprising a horizontally disposed rotary auger and a forwardly and upwardly opening generally U-shaped trough therefor,
(f) said auger comprising an axially extended core element which tapers from one end thereof to a delivery portion thereof, and a helical conveyor flight element which extends from said one end to said delivery portion,
(g) said conveyor flight element being of constant maximum diameter throughout its length and having a minimum diameter which decreases from said one end of auger to said delivery portion thereof in direct proportion to the decrease in diameter of said core element.

2. A swather comprising:
(a) a mobile frame,
(b) a windrower secured to the forward portion of said frame,
(c) said windrower comprising a horizontally disposed mower elongated in a direction transversely to the direction of travel of said mobile frame and an auger conveyor generally rearwardly of said mower and generally parallel thereto for receiving cut material from said mower and delivering said material in directions longitudinally of said mower and depositing said material on the ground in a windrow intermediate opposite ends of said conveyor,
(d) said conveyor including an upwardly and forwardly opening trough, the central portion of which defines a discharge opening for said material,
(e) said auger comprising an axially extended core element which tapers from opposite ends thereof to a diametrically reduced central delivery portion adjacent said discharge opening, and opposed helical conveyor flight elements, one each extending from one of said opposite ends of said core element to a point adjacent the delivery portion of said core element, and each thereof adapted to deliver said material to said discharge opening,
(f) said conveyor flight elements being of constant maximum diameters throughout their lengths and having minimum diameters which decrease from the opposite ends of said core element to said delivery portion thereof in direct proportion to the decrease in diameter of the adjacent portion of said core element.

References Cited by the Examiner

UNITED STATES PATENTS 2,427,876 9/1947 Pool et al. _____ 198—9
2,878,635 3/1959 Damkroger _____ 56—192

ABRAHAM G. STONE, *Primary Examiner.*

ANTONIO F. GUIDA, *Examiner.*